United States Patent
Long

(10) Patent No.: US 6,667,589 B2
(45) Date of Patent: Dec. 23, 2003

(54) ELECTRICITY DISTRIBUTION NETWORK FOR A MOTOR VEHICLE

(75) Inventor: Marc Long, Paris (FR)

(73) Assignee: Johnson Controls Automotive Electronics (FR)

(*) Notice: Subject to any disclaimer, the term of this patent is extended or adjusted under 35 U.S.C. 154(b) by 0 days.

(21) Appl. No.: 10/145,766

(22) Filed: May 16, 2002

(65) Prior Publication Data

US 2002/0190809 A1 Dec. 19, 2002

(30) Foreign Application Priority Data

May 18, 2001 (FR) .............................. 01 06582

(51) Int. Cl.$^7$ .................. H02P 1/00; H02P 3/00
(52) U.S. Cl. ............... 318/139; 318/254; 318/375; 318/439; 318/434; 318/134; 318/128; 318/129
(58) Field of Search ................ 318/128, 129, 318/130, 131, 132, 133, 134, 139, 254, 375, 439, 434

(56) References Cited

U.S. PATENT DOCUMENTS

| | | | | |
|---|---|---|---|---|
| 3,634,743 A | * | 1/1972 | Ingenito | 318/138 |
| 3,753,077 A | * | 8/1973 | Anderson et al. | 363/124 |
| 3,927,357 A | * | 12/1975 | Konrad | 318/139 |
| 4,423,362 A | * | 12/1983 | Konrad et al. | 318/139 |
| 5,296,785 A | * | 3/1994 | Miller | 318/254 |
| 5,698,905 A | * | 12/1997 | Ruthlein et al. | 290/32 |
| 5,828,192 A | * | 10/1998 | Kawaguchi et al. | 318/139 |
| 6,034,507 A | * | 3/2000 | Ikawa et al. | 320/136 |
| 6,125,798 A | * | 10/2000 | Kuwayama et al. | 123/41.12 |
| 6,166,500 A | * | 12/2000 | Makaran | 318/254 |
| 6,578,649 B1 | * | 6/2003 | Shimasaki et al. | 180/65.2 |

FOREIGN PATENT DOCUMENTS

| | | |
|---|---|---|
| DE | 196 21 555 C | 8/1997 |
| EP | 0 790 692 A | 8/1997 |
| EP | 0 858 142 A | 8/1998 |

* cited by examiner

Primary Examiner—Michael Tokar
Assistant Examiner—Linh Van Nguyen
(74) Attorney, Agent, or Firm—Foley & Lardner

(57) ABSTRACT

An electricity distribution network for a motor vehicle, the network having at least two pieces of equipment connected to a storage battery, at least one of the pieces of equipment operates in a pulse mode likely to create oscillations in the network at a resonant frequency thereof, the network includes at least one resistive element and capacitor that are associated in series and that are of resistance and capacitance determined so that the resistance of the resistive element is equal to a damping resistance for the network.

6 Claims, 1 Drawing Sheet

ELECTRICITY DISTRIBUTION NETWORK FOR A MOTOR VEHICLE

The present invention relates to an electricity distribution network for a motor vehicle, suitable for use, for example, to power electrical equipment on board motor vehicles such as cars, trucks, . . . .

BACKGROUND OF THE INVENTION

A conventional type of electricity distribution network for a motor vehicle generally comprises a battery connected to equipment on board the vehicle. The battery is thus connected to an alternator so as to be recharged by the alternator, and to pieces of equipment that consume electricity so as to power them. Common examples of such pieces of equipment comprise in particular the starter, the ignition system, the heater or air conditioner, lighting elements such as headlights, electric motors for driving windscreen wipers, windows, fans, . . . .

In the automotive industry, more and more high-power electronic circuits are being used. Such circuits include proposed electromagnetic actuators for valves, i.e. circuits that operate in pulse mode with sudden changes in the amount of power they draw.

The use of such circuits presents consequences for the network. Thus, it is necessary for the network to present resistance that is low enough to limit losses by the Joule effect. In order to limit the effects of current spikes, decoupling capacitors are associated with the circuits and/or the battery so that the network then has a relatively large amount of distributed capacitance. In addition, because of the size and the location of the conductors of the network, the network presents a relatively large amount of inductance.

The network thus constitutes an oscillating circuit of the "RLC" type. Current spikes drawn by circuits operating in pulse mode then run the risk of setting the network into resonance which will overload the battery and the decoupling capacitors, with this happening particularly easily when the circuits operate at an excitation frequency close to the resonant frequency of the network. Such overloading harms the reliability of the battery and the capacitors and can lead to them deteriorating.

OBJECTS AND SUMMARY OF THE INVENTION

An object of the invention is to provide a distribution network that is reliable and of low cost and that includes at least one circuit operating in pulse mode.

To this end, the invention provides an electricity distribution network for a motor vehicle, the network having at least two pieces of equipment connected to a storage battery, at least one of the pieces of equipment operating in a pulse mode likely to create oscillations in the network at a resonant frequency thereof, the network including at least one resistive element and capacitor that are associated in series and that are of resistance and capacitance determined so that the resistance of the resistive element is equal to a damping resistance for the network.

The resistive element can then damp the oscillations of the network which therefore does not enter into resonance, thus limiting the risks of the storage battery and the other elements constituting the network being overloaded. Since the capacitor prevents the DC component of the electricity carried by the network from passing through the resistive elements, Joule effect loses in the resistive element are limited.

Preferably, the resistive element and the capacitor are connected between terminals for connecting the piece of equipment that operates in pulse mode to the network.

The resistive element and the capacitor may then be integrated in the circuit of the equipment that operates in pulse mode. As a result, this equipment can be connected to the network without there being any need to modify its architecture.

Advantageously, the resistive element and the capacitor form a damping circuit located close to an end of the network, and preferably the network has a plurality of damping circuits, each adjacent to an end of the network.

Damping is then particularly effective.

BRIEF DESCRIPTION OF THE DRAWING

Other characteristics and advantages of the invention appear on reading the following description of particular, non-limiting embodiments of the invention.

Reference is made to the accompanying drawing, in which.

MORE DETAILED DESCRIPTION

The electricity distribution network for a motor vehicle in accordance with the invention is designed to be included in a motor vehicle to deliver electrical power to equipment on board the vehicle.

Figure 1:
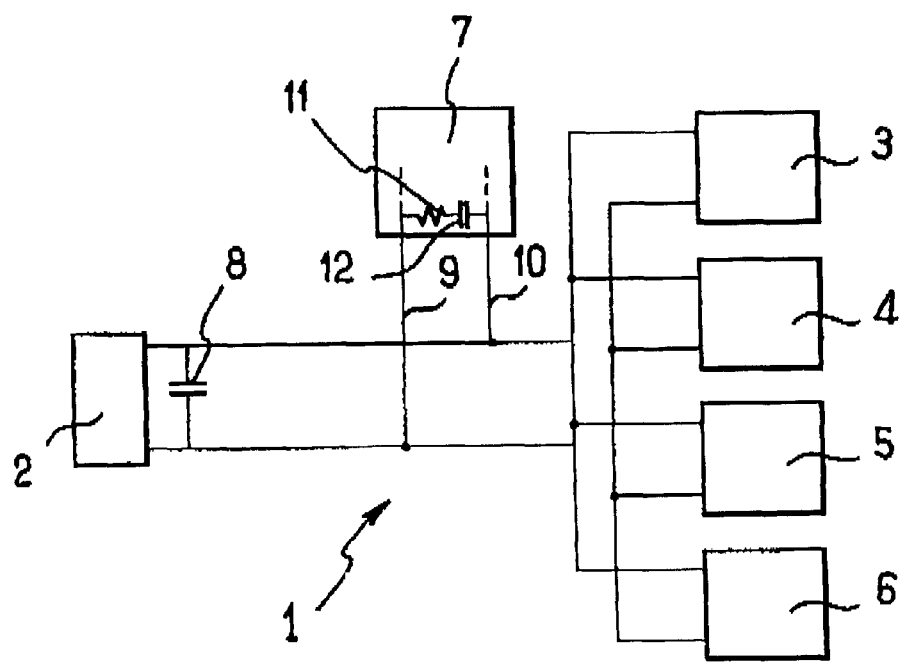
FIG. 1 is a diagram of a network constituting a first embodiment of the invention.

With reference to FIG. 1, the network given overall reference 1 is of the star type and comprises a battery 2 connected to pieces of equipment 3, 4, 5, 6, and 7 and also to a high capacitance decoupling capacitor 8 which is connected in parallel with the terminals of the battery 2. An alternator (not shown) is also connected to the battery 2 in order to recharge it.

The pieces of equipment 3, 4, 5, and 6 are pieces of electrical equipment of conventional type.

The other piece of equipment, 7, operates in pulse mode as an electromagnetic actuator for valves. The equipment 7 has terminals 9 and 10 for connection to the battery 2.

The network 1 includes a resistive element 11 and a capacitor 12 that are connected in series with each other and that are connected between the terminals 9 and 10 of the equipment 7.

The dimensioning of the resistive element 11 and of the capacitor 12 is explained below.

The network 1 constitutes an oscillating circuit having a resonant frequency which can be calculated in a manner conventional for oscillating circuits on the basis of the equivalent inductance of the network and the equivalent capacitance of the network (which can be considered as being equal to the capacitance of the capacitor 8, said capacitance being so great that all of the other capacitance in the network can be ignored).

The resistive element 11 and the capacitor 12 have resistance and capacitance such that, at the resonant frequency of the network 1, the resistive element 11 damps the oscillations of the network 1, i.e the resistance of the resistive element 11 corresponds to the damping resistance for the network 1 which is proportional to $\sqrt{(L_0/C_0)}$ where $L_0$ and $C_0$ are respectively the equivalent inductance and the equivalent capacitance of the network 1.

The capacitance of the capacitor 12 is determined in such a manner that the impedance of the capacitor 12 at the resonant frequency of the network 1 is much lower than the equivalent resistance of the network 1.

Thus, when the equipment 7 is operating in pulse mode and generating oscillations in the network 1 at a frequency lower than the resonant frequency of the network 1, the resistance of the network 1 is relatively low. When the equipment 7 operates in pulse mode to generate oscillations in the network 1 at a frequency equal to or greater than the resonant frequency of the network 1 (in particular when the excitation frequency of the equipment 7 is close to the resonant frequency of the network), the capacitor 12 becomes conductive and the resistive element 11 damps the oscillations of the network 1.

It should be observed that the damping is particularly effective in a star network when the resistive element 11 and the capacitor 12 are located adjacent to the distribution point of the network, as in this case.

Figure 2:
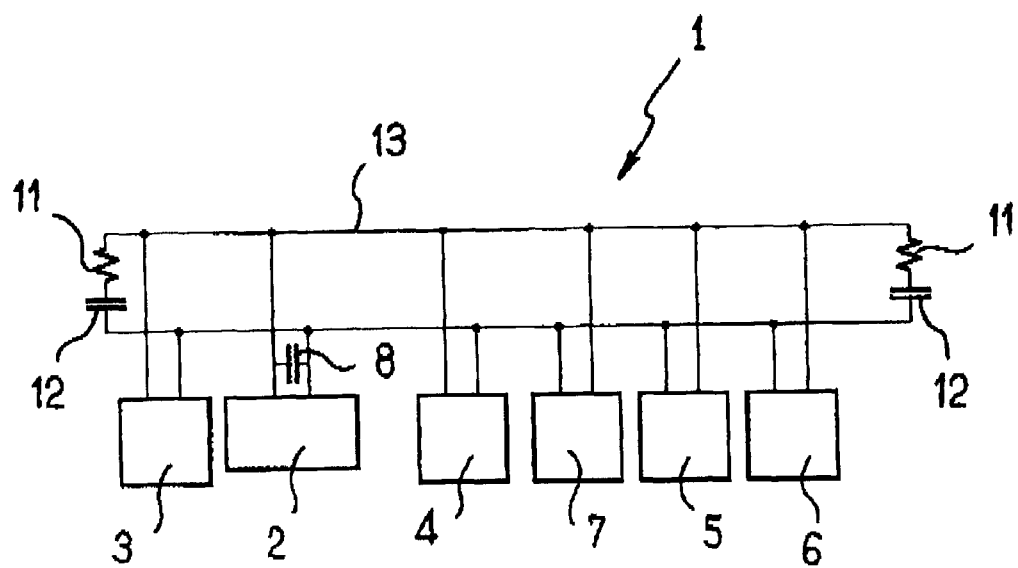
FIG. 2 is a diagram of a network constituting a second embodiment of the invention.

Elements that are identical or analogous to those described above are given identical numerical reference in the description below which relates to the second embodiment as shown in FIG. 2.

In this embodiment, the battery 2, the capacitor 8, and the pieces of equipment 3, 4, 5, 6, and 7 are interconnected by a bus 13.

This bus 13 possesses two ends, each of which has a resistive element 11 and a capacitor 12 connected thereto.

The resistive element 11 and the capacitor 12 are dimensioned as described above so as to form a circuit for damping the network 1.

The damping achieved in this way is particularly effective.

Naturally, the invention is not limited to the embodiment described and various embodiments can be provided without going beyond the scope of the invention as defined in the claims.

In particular, the invention is applicable to any type of distribution network, such as a 12-volt network, a 42-volt network, and having various different numbers of pieces of equipment, . . . .

In addition, the resistive element and the capacitor can be located at any point of the network, for example in parallel with the storage battery. The resistive element and the capacitor can also be integrated in a piece of equipment that operates in pulse mode, or they need not be integrated in any piece of equipment.

Furthermore, although only one damping circuit is shown in the star network of FIG. 1, a plurality of damping circuits can be included in that network to improve damping. Thus, if the branch connections are long, it can be preferable to provide a plurality of damping circuits adjacent to some of the ends of the network (for example a damping circuit can be placed adjacent to the battery 2 and another damping circuit adjacent to the actuator 6) or a damping circuit can be placed at each end of the network.

Although two damping circuits are shown in the bus type network of FIG. 2, it is possible to use a single damping circuit, preferably mounted at one of the ends of the bus.

What is claimed is:

1. An electricity distribution network for a motor vehicle, the network having at least two pieces of equipment connected to a storage battery, wherein at least one of the pieces of equipment operates in a pulse mode likely to create oscillations in the network at a resonant frequency thereof, and wherein the network includes at least one resistive element and capacitor that are associated in series and that are of resistance and capacitance determined so that the resistance of the resistive element is equal to a damping resistance for the network.

2. A network according to claim 1, wherein the resistive element and the capacitor are connected between terminals for connecting the piece of equipment that operates in pulse mode to the network.

3. A network according to claim 1, wherein the resistive element and the capacitor form a damping circuit located close to one end of the network.

4. A network according to claim 3, including a plurality of damping circuits each adjacent to an end of the network.

5. A network according to claim 1, wherein the pieces of equipment and the storage battery are interconnected by a bus having two ends, and wherein the network has at least one damping circuit adjacent to one of the ends of the bus.

6. A network according to claim 5, having two damping circuits each adjacent to a respective end of the bus.

* * * * *